United States Patent [19]
Shaw et al.

[11] Patent Number: 5,967,874
[45] Date of Patent: Oct. 19, 1999

[54] BOOK WITH THREE DIMENSIONAL SCULPTURE AND SELF SUPPORTING CORE

[75] Inventors: Sandra C. Shaw; Karl Chan, both of Hong Kong, China

[73] Assignee: Hua Yang Printing Co., Tai Po, The Hong Kong Special Administrative Region of the People's Republic of China

[21] Appl. No.: 08/975,772

[22] Filed: Nov. 21, 1997

Related U.S. Application Data

[60] Provisional application No. 60/031,691, Nov. 22, 1996.

[51] Int. Cl.[6] .............................. A63H 3/00; A63H 33/38; B42D 3/18; G09F 13/00
[52] U.S. Cl. .............................. 446/73; 446/147; 281/36; 281/51; 40/538
[58] Field of Search .................................. 446/71, 72, 73, 446/79, 80, 147, 151, 152, 487, 488; 281/36, 37, 51; 40/530, 538

[56] References Cited

U.S. PATENT DOCUMENTS

| | | | |
|---|---|---|---|
| 784,477 | 3/1905 | Dean | 281/15.1 |
| 1,490,295 | 4/1924 | Stephens | 446/147 X |
| 2,314,721 | 3/1943 | Lowenstein | 446/147 X |
| 4,176,473 | 12/1979 | Rae | 446/147 |
| 4,280,241 | 7/1981 | Pfaff | 281/51 X |
| 4,440,422 | 4/1984 | Bruchas | 281/15.1 |
| 4,597,743 | 7/1986 | Becker et al. | 446/147 |
| 4,819,963 | 4/1989 | Wolski . | |
| 4,828,289 | 5/1989 | Korner | 281/36 X |
| 4,865,574 | 9/1989 | Kobayashi | 446/72 |
| 4,877,269 | 10/1989 | Callaghan et al. | 281/15.1 X |
| 4,909,542 | 3/1990 | Marks | 446/73 X |
| 4,925,328 | 5/1990 | Jeffries | 281/15.1 X |
| 5,383,684 | 1/1995 | Smath | 446/147 X |
| 5,425,554 | 6/1995 | Lamanna | 281/37 X |
| 5,682,990 | 11/1997 | Schluger | 281/36 X |

*Primary Examiner*—D Neal Muir
*Attorney, Agent, or Firm*—Cumpston & Shaw

[57] ABSTRACT

An educational reading device having a core leaf of a first thickness and a plurality of secondary leaves having a thickness less than the first thickness, the secondary leaves connected to the core leaf to dispose a portion of the core leaf intermediate two secondary leaves. The device includes a three dimensional sculptured head connected to the core leaf and a foot for orienting the device in an upright orientation. The secondary leaves are connected to the core leaf to permit the secondary leaves to be opened as a book.

12 Claims, 4 Drawing Sheets

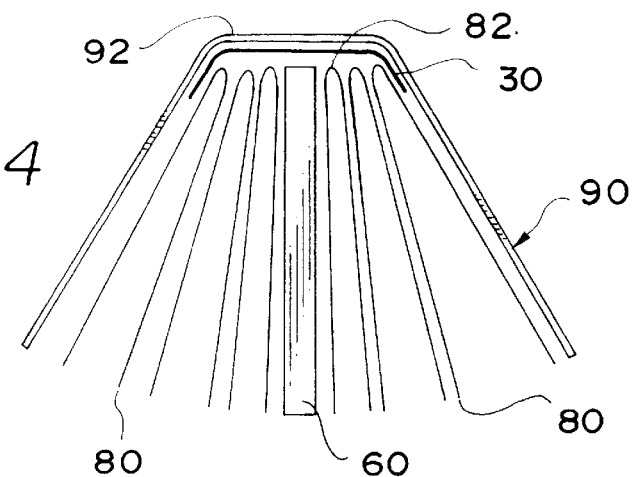
FIG. 4
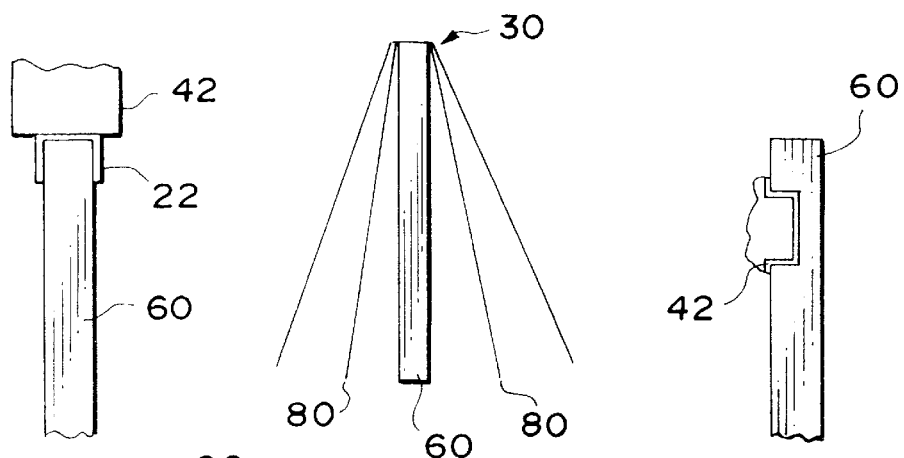
FIG. 5
FIG. 7
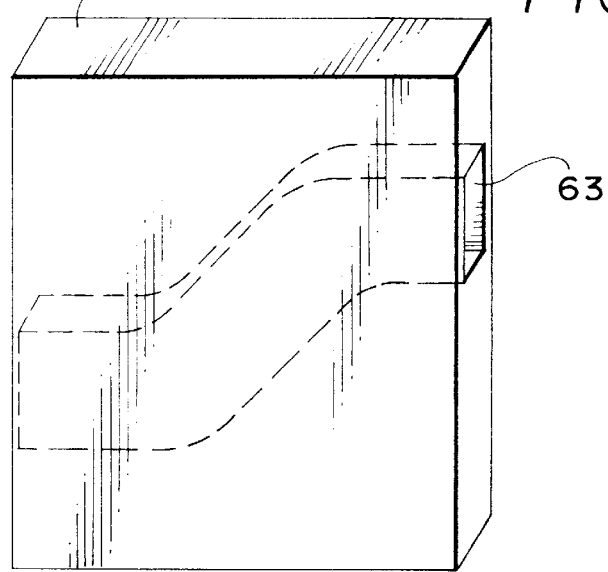
FIG. 8
FIG. 6

BOOK WITH THREE DIMENSIONAL SCULPTURE AND SELF SUPPORTING CORE

This application claims the benefit of U.S. Provisional application Ser. No. 60/031,671 filed Nov. 22, 1996.

FIELD OF THE INVENTION

The present invention relates to reading devices, and more particularly, to books that incorporate a three dimensional sculpture connected to a rigid core page and have a plurality of thinner secondary pages connected to the core page.

BACKGROUND OF THE INVENTION

It is sometimes difficult to interest young children in reading books. The prior art has addressed this problem by incorporating entertainment features into children's books to enhance the child's enjoyment, or by designing the books so that they are visually attractive and have eye-catching features. Such entertainment features have included pop-up figures. These entertainment features, however, are sometimes damaged or separated from the book during normal use. Such damage or separation may thereby cause the book to lose its interest and attractiveness to the child. Similarly, educational books which provide teaching tools which are separate and distinct from the printed materials are known in the art. However, because the teaching tools are separate, they have the disadvantage that the printed portion may be lost or misplaced from the teaching tools, and thus render that portion substantially useless.

U.S. Pat. No. 4,487,590 discloses two-dimensional children's books in which there are structural openings adjacent to the edges of the book. The printed matter depicts a scene and a steering wheel adjacent to the openings so that a child can place his fingers through those openings as if to grasp the steering wheel. This structure, while providing some play or toy features, includes no substantial three-dimensional or sculptural features.

There is a need for books which incorporate and combine three-dimensional structural features which permit the book to also function as a sculpture, and in certain instances take the form of a toy which can maintain a child's interest over a long period of time. The need exists for the creation of three dimensional figures or dolls that also provide the myriad of benefits offered by traditional printed matter. The need also exists for a structure that can support the dual function of a three dimensional sculpture and a book.

SUMMARY OF THE INVENTION

The present invention provides a reading device which offers the traditional benefits of printed pictures and words, as well as a free standing toy, independent of a reading of the book. That is, the present invention includes the incorporation of a three dimensional figure and a traditional book.

A particular embodiment of the invention includes a three dimensional sculpted character head; a plurality of book leaves having a peripheral shape defining a character body attached to the head to permit the leaves to be selectively opened for reading; and a character limb attached to one of the leaves.

In a preferred embodiment, the reading device includes a core leaf connected to the head. Although the head may be connected in a releasable manner, it is contemplated the head is fixedly connected to the core leaf. The core leaf has a greater rigidity than adjacent leaves and functions as a structural member to which the head is connected. The core leaf may also have a peripheral shape defining the character body. It is further contemplated that the secondary leaves which define the peripheral shape of the character body may represent a substantially three dimensional versus a two dimensional representation. That is, adjacent leaves may be formed with slightly different peripheries so that outer leaves are smaller than inner leaves. It is understood that a body graphic may be disposed on an outside surface portion of one of the book leaves, preferably the outer leaves.

BRIEF DESCRIPTION OF THE DRAWINGS

FIG. 4 is a top plan view of an exploded book showing the core leaf and the secondary leaves.

FIG. 5 is top plan view showing an alternative binding.

FIG. 6 is a schematic view of a core having a cavity.

FIG. 7 is a schematic view of a connection of a coupler and a core leaf.

FIG. 8 is a schematic view of an alternative coupler and a core leaf.

DETAILED DESCRIPTION OF THE PREFERRED EMBODIMENTS

Figure 1:
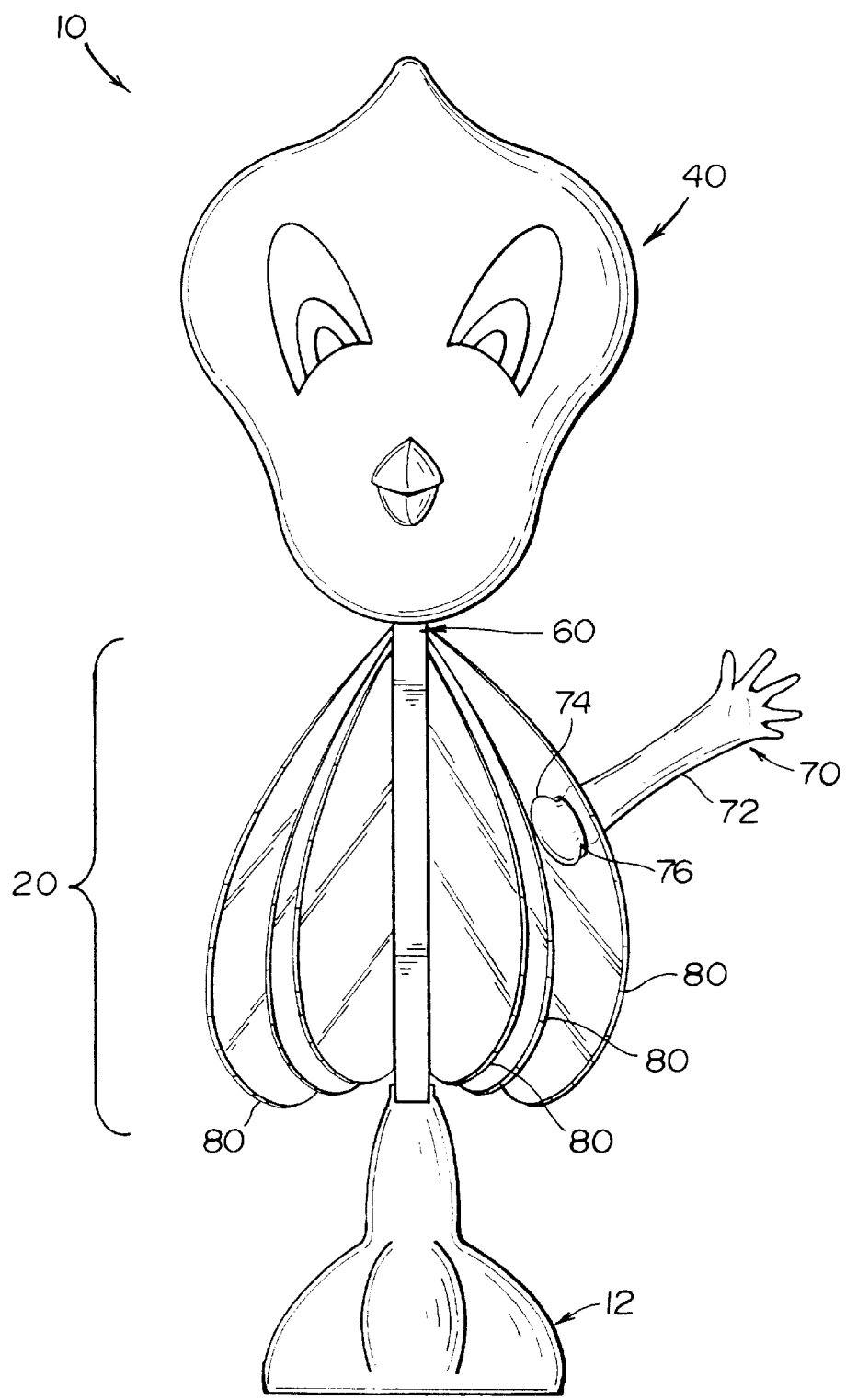
FIG. 1 is a front elevational view of the present invention showing a core leaf and connected three dimensional head and appendage.

Referring to FIG. 1, the educational reading device 10 of the present invention includes a book portion 20, a head 40, a core leaf 60 and a plurality of secondary leaves 80. The secondary leaves 80 are connected to the core leaf 60 to be movable between a closed position, parallel to the core leaf 60 and a reading position having a portion spaced from the core leaf. Preferably, the head 40 is a three dimensional sculpture. Further, the reading device 10 may include at least one appendage 70 connected to the book portion 20.

As shown in FIG. 1, a particular embodiment of the invention includes the three dimensional sculpted character head 40; the plurality of secondary leaves 40 having a peripheral shape defining a character body attached to the head to permit the leaves to be selectively opened for reading; and a character limb 72 as the appendage 70 connected to one of the leaves.

In a preferred embodiment, the device 10 is constructed to be self supporting in an upright position. Thus, the device 10 may include feet or a single foot 12. The foot 12 may be a separate element connected to the book portion 20. Alternatively, the foot 12 may be formed as an integral part of the book portion 20.

The sculptured head 40 is a three dimensional element defining a volume. The head 40 may be made from a variety of materials such as plastic, foam, wood, metal or other formable material. Preferably, the head 40 is formed of a relatively light weight plastic may a molding process such as injection, blow or cavity molding.

Referring to FIGS. 7 and 8, the head 40 includes a head coupler 42 for engaging the book portion 20. The head coupler 42 may be any of a variety of configurations for releasably or permanently connecting the head 40 to the book portion 20. For example, the head coupler 42 may include a threaded section, detents or friction fit components.

Figure 3:
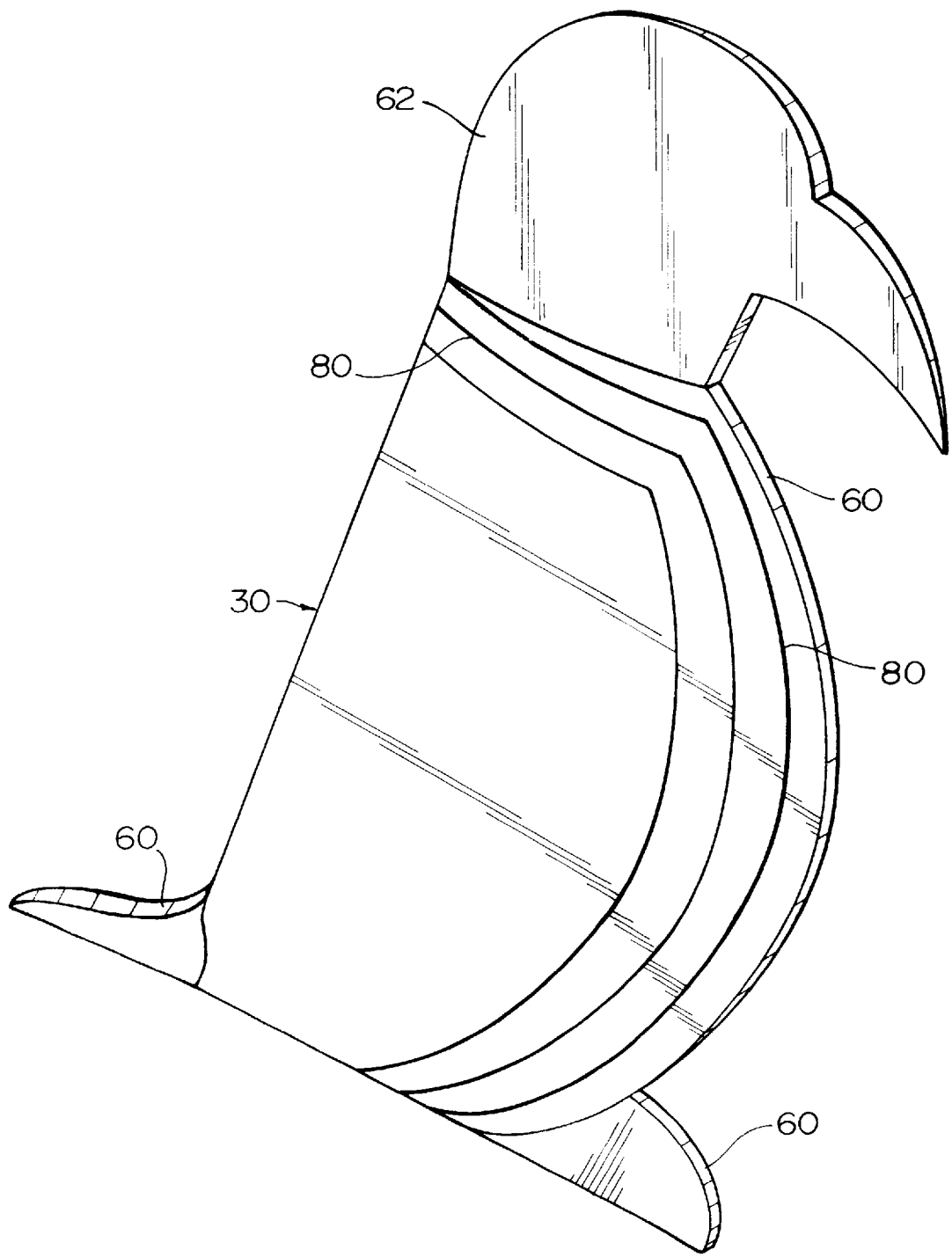
FIG. 3 is a is a perspective view of an alternative embodiment showing a core leaf and connected three dimensional head, available text portions wherein the feet are a portion of the core leaf.

In a preferred embodiment, the book portion 20 includes a core leaf 60 and a plurality of secondary leaves 80. The core leaf 60 and the secondary leaves 80 define a body corresponding to the head 40. The core leaf 60 may also have a peripheral shape defining the character body. As shown in FIG. 3, the secondary leaves 80 which define the peripheral shape of the character body may represent a substantially three dimensional versus a two dimensional representation. That is, secondary leaves 80 may be formed with slightly different peripheries so that outer leaves 80 are smaller, or larger, than inner leaves. Each secondary leaf 80 has a slightly different periphery than the adjacent leaves so as to define a generally three dimensional book portion. A body graphic may be disposed on an outside surface portion of one of the secondary leaves 80, preferably outer secondary leaves. Thus, the secondary leaves 80 may be employed to substantially define a body corresponding to the head 40.

Figure 2:
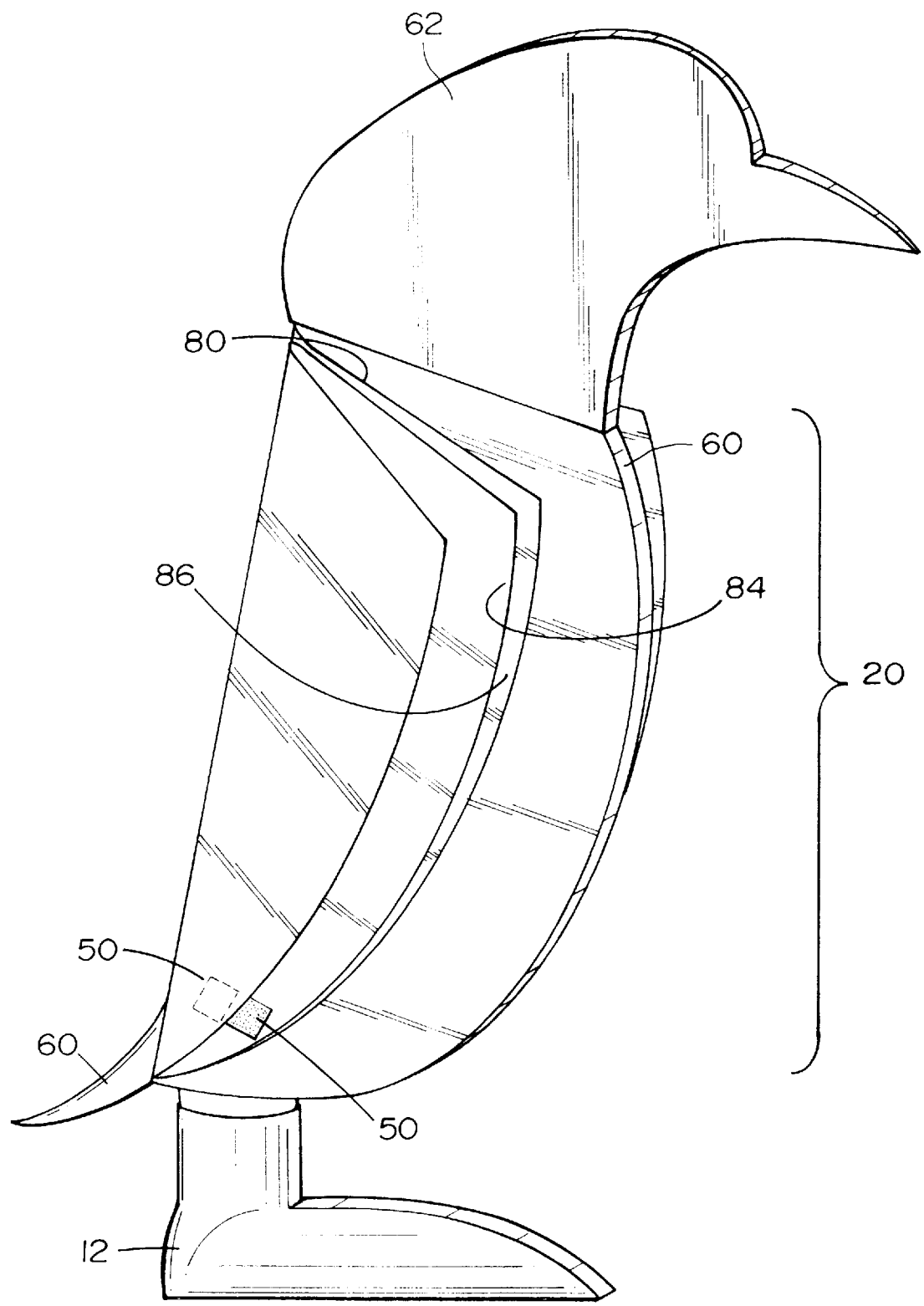
FIG. 2 is a is a perspective view of an alternative embodiment showing a core leaf and connected three dimensional head, available text portions and appendage.

Alternatively as shown in FIGS. 2, 4 and 5, each of the secondary leaves 80 has a substantially common periphery. Further, a portion of the core leaf 60 periphery may be defined by the common periphery. In this configuration, the leaves forming the body define a common periphery. The secondary leaves 80 have a text portion for bearing printed matter such as text of graphics. Further, the secondary leaves 80 may be printed prior to incorporation into the reading device 10. Alternatively, the text or graphic information may be attached to the secondary leaves 80 subsequent to formation of the reading device 10.

The core leaf 60 has a greater rigidity than the secondary leaves 80 and functions as a structural support member of the device 10. The core leaf 60 is connected to, or includes a body coupler 22 for connecting to the head coupler 42 and hence the head 40. The body coupler 22 is a corresponding structure to the head coupler 42 and is selected to connected to the head coupler. Although the head 40 may be connected in a releasable manner, it is contemplated the head is fixedly attached to the core leaf 60.

In a further embodiment, the core leaf 60 extends beyond the periphery of the secondary leaves 80 and may define a periphery of a flat head 62 or engage the sculpted head 40. Alternatively, an extending portion of the core leaf 60 may form a body portion with the secondary leaves 80 defining an appendage(s) to the body. Appendages 70 or limbs corresponding to the head 40 may be affixed to the front and back covers or project from the common periphery or part of the core leaf 60. It is also contemplated that the back or dorsal portion of the figure represented by the head 40 (either sculpted or part of the core) and the periphery of the secondary leaves 80 may coincide with the binding of the leaves.

The secondary leaves 80 and core leaf 60 may be formed of a variety of materials including composites, laminates, plastics, paper or pulp based materials. Preferably, inside secondary leaves 80 are formed of 350 gram (20 point) manila board with the core leaf 60 formed of a two millimeter manila board sandwiched between two 350 gram manila boards. A front and back cover piece 90 is formed from a laminate of a 350 gram manila board with a 1 millimeter manila board and a second 1 millimeter manila board. The core leaf 60 may have a thickness of approximately 2 to 10 times the thickness of a secondary leaf 80. Further, it is contemplated the core leaf 60 may be formed of a relatively rigid material such as thermosetting plastic. While such construction of the core leaf 60 may provide sufficient rigidity in a thickness proximal to the secondary leaves 80, it is preferred that the thickness of the core leaf 60 remain between twice and ten times the thickness of the secondary leaves 80.

In a particular embodiment, the secondary leaf 80 to which the appendage 70 or limb is attached includes an aperture 83 and the appendage has an enlarged head 74 bigger than the aperture and a neck 76 smaller than the aperture connecting the head to the appendage. Alternatively, an appendage 70 such as a tail may be attached to or extend from a binding 30 of the secondary leaves 80 and the core leaf 60.

The binding 30 may extend along only a relatively small length of the periphery of the reading device 10, including less than 25 percent of the periphery. Thus, the binding 30 overlies the folds of the secondary leaves 80 or the common bound edge of the secondary leaves.

Referring to FIG. 4, in an alternative embodiment, the present invention includes a core leaf 60 of a first thickness and a plurality of secondary leaves 80 of a second, smaller thickness. Preferably, each secondary leaf 80 includes a fold 82 and defines a symmetric periphery about the fold. Each secondary leaf 80 thus has a front side 84 and a back side 86, with a left hand portion to the left of the fold 82 and a right hand portion to the right of the fold, as shown in FIG. 4. In construction, a back side 86 of a right hand portion of a first secondary leaf 80 is bonded or affixed to the left side of the core leaf 60 and a back side 86 of a left hand portion of the second secondary leaf 80 is bonded to the right side of the core leaf 60.

Additional secondary leaves 80 may be joined such that the back side 86 of a left hand portion is affixed to the back side 86 of a right hand portion of an adjacent secondary leaf 80. Preferably, the core leaf 60 is symmetrically disposed within a plurality of secondary leaves 80. The core leaf 60 and the bonded secondary leaves 80 are aligned such that the folds 82 lie in a substantially common plane. The common plane forms at least a portion of the binding 30. As shown in FIGS. 2 and 3, a portion of the core leaf 60 may extend beyond the binding 30 and the common plane.

The cover piece 90 is disposed upon the backside 86 of a left hand portion of an outermost secondary leaf 80 on the left side of the core leaf 60 and a back side 86 of a right hand portion of an outermost secondary leaf 80 on the right side of the secondary leaf 80. The cover piece 90 includes a spine section 92 having a width substantially equal to that of the combined thickness of the folds 82 and the core leaf 60.

In a further embodiment, the core leaf 60 may have a left side, a right side and a first thickness, wherein a first secondary leaf 80 of a second smaller thickness is bound to the core leaf and moveable between a first position adjacent the left side of the core leaf and a second position spaced from the left side of the core leaf and a second secondary leaf 80 of the second smaller thickness is bound to the core leaf and movable between a first position adjacent the right side of the core leaf and a second position spaced from the right side of the core leaf. Preferably, the secondary leaves 80 and the core leaf 60 are bound along a substantially common plane.

In a specific embodiment, the reading device 10 may include seven leaves including a cover piece 90 and the core leaf 60.

As stated, the core leaf 60 may extend substantially beyond the plane of the binding 30, such that the secondary leaves 80 themselves form an appendage on the core leaf. That is, the binding 30 of the core leaf 60 and the secondary leaves 80 need not be disposed along an edge of the core leaf. In addition, the secondary leaves 80 may incorporate a honeycomb structure intermediate adjacent secondary leaves, or a secondary leaf and the core leaf 60. Upon movement of the secondary leaves 80 connected to the honeycomb structure, the honeycomb structure creates at least a body portion or other complimentary structure to the overall design of the reading device 10.

In an alternative construction of the reading device 10, the secondary leaves 80 may form an appendage 70. However, the binding 70 and thickness of the secondary leaves 80 may be such that the secondary leaves tend to assume an open, reading position. It is preferred to allow the reading device 10 to maintain a relatively collapsed configuration. Thus, the secondary leaves may include a releasable fastener 50 to retaining the leaves in a predetermined position. The fasteners 50 may include complimentary hook and loop fasteners, releasable adhesives or magnetic members. For example the magnetic members may be connected to or integrally connected to the secondary leaves 80 in a foot 12.

The relative thickness of the core leaf 60 provides for a number of constructions. Specifically, as shown in FIG. 6, portions of the core leaf 60 may be hollowed out or formed with cavities 63 sized to receive animating structures such as appendages or accessories. For example, if the core leaf 60 were configured as a kangaroo, the core leaf may include a cavity 63 sized to receive a baby Joey. The Joey could be selectively movable from a retracted position within the cavity 63 to an extended position outside the cavity. Movement of the Joey is accomplished by linkages similar to those used in "pop-up" type books. The linkages may also move through channels within the width of the core leaf 60. In particular, the tail of the kangaroo, which has the approximate thickness of the core leaf 60 may be moveable, wherein such movement disposes the Joey between the retracted and the extended positions.

Alternatively, the cavities 63 in the core leaf 60 may be used to releasably retain accessories such as eggs, for reading devices books having a bird like configuration, or a duck billed platypus. The accessories (eggs) may be forced from the cavity 63 by movement of a particular secondary leaf 80, or the movement of a linkage extending from the core leaf 60.

It is further contemplated that the cavities 63 in the core leaf 60 may accommodate sound or light generating mechanisms, wherein these mechanisms are selectively actuated by motion of a particular secondary page or linkages.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims which scope is to be accorded the broadest interpretation so as to encompass all such modifications and equivalent structures.

We claim:

1. A reading device, comprising:
    (a) a three dimensional sculpted character head including a three dimensional element defining a volume of varying thicknesses;
    (b) a core leaf and a plurality of secondary leaves bound along a common binding, the secondary leaves having a peripheral shape defining a character body, with plural secondary leaves one each side of the core leaf the head extending above the secondary leaves defining the character body and attached to the core leaf at a second connection spaced from the common binding to permit the secondary leaves to be selectively opened for reading; and
    (c) a character appendage connected to one of the secondary leaves.

2. A reading device, comprising:
    (a) a core leaf having a first thickness; and
    (b) a plurality of secondary leaves having a second thickness which is less than the first thickness, the secondary leaves attached to the core leaf to preclude reordering of the leaves and to dispose a portion of the core leaf intermediate at least two secondary leaves and to permit the secondary leaves to be selectively opened for reading; and (c) a character head attached to the core leaf.

3. A reading device, comprising:
    (a) a three dimensional sculpted character head including a three dimensional element defining a volume of varying thicknesses;
    (b) a core leaf having a first thickness, the core leaf connected to the head; and
    (c) a plurality of secondary leaves bound along a common binding, independent of the connection of the core leaf to the head, to the core leaf to locate a portion of the core leaf intermediate a first secondary leaf and a second secondary leaf, and permit the secondary leaves to be selectively opened for reading, each of the secondary leaves having a thickness less than the first thickness.

4. The reading device of claims 1, 2 or 3, wherein a plurality of the secondary leaves include a fold and have a symmetric periphery about the fold.

5. The reading device of claims 1, 2 or 3, wherein a plurality of the secondary leaves include a fold and are joined together to dispose the folds of adjacent secondary leaves in a substantially common plane.

6. The reading device of claims 2 or 3, wherein a portion of the core leaf extends beyond the common plane.

7. The reading device of claims 2 or 3, wherein the core leaf and the secondary leaves are joined only along a binding.

8. The reading device of claims 1, 2 or 3, wherein a first secondary leaf defines a first and a second page for presentation to a reader, and the first secondary leaf is joined to a second secondary leaf and a third secondary leaf over an area substantially equal to an area of the first and the second page.

9. The reading device of claims 2 or 3, wherein the thickness of the core leaf is approximately two to 10 times greater than the thickness of a secondary leaf.

10. The reading device of claims 1, 2 or 3, wherein each secondary leaf is at least partially defined by a peripheral shape defining at least a portion of a character body.

11. The reading device of claims 1, 2 or 3, wherein adjacent secondary leaves have peripheries that are offset by a predetermined distance.

12. The reading device of claims 2 or 3, further comprising a character appendage attached to one of the secondary leaves.

\* \* \* \* \*